(12) United States Patent
Zhang et al.

(10) Patent No.: US 12,323,388 B2
(45) Date of Patent: Jun. 3, 2025

(54) TRAFFIC TRANSMISSION CONTROL METHOD, APPARATUS, DEVICE, AND STORAGE MEDIUM

(71) Applicant: Beijing Volcano Engine Technology Co., Ltd., Beijing (CN)

(72) Inventors: Chen Zhang, Beijing (CN); Hui Luo, Beijing (CN); Jianxin Guo, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/930,882

(22) Filed: Oct. 29, 2024

(65) Prior Publication Data

US 2025/0055832 A1    Feb. 13, 2025

Related U.S. Application Data

(63) Continuation of application No. PCT/CN2023/086761, filed on Apr. 7, 2023.

(51) Int. Cl.
*H04L 9/40* (2022.01)
*H04L 47/20* (2022.01)
*H04L 47/2475* (2022.01)

(52) U.S. Cl.
CPC .......... *H04L 63/0227* (2013.01); *H04L 47/20* (2013.01); *H04L 47/2475* (2013.01); *H04L 63/0236* (2013.01)

(58) Field of Classification Search
CPC . H04L 63/0227; H04L 47/20; H04L 47/2475; H04L 63/0236
See application file for complete search history.

(56) References Cited

U.S. PATENT DOCUMENTS

2009/0328210 A1   12/2009   Khachaturov et al.
2010/0095367 A1*   4/2010   Narayanaswamy ........................ H04L 63/0263
                                                                                                        726/12

(Continued)

FOREIGN PATENT DOCUMENTS

CN        107666446 A     2/2018
CN        107835179 A     3/2018

(Continued)

OTHER PUBLICATIONS

International Patent Application No. PCT/CN2023/086761; Int'l Search Report; dated May 22, 2023; 2 pages.

(Continued)

*Primary Examiner* — Huan V Doan
(74) *Attorney, Agent, or Firm* — BakerHostetler

(57) ABSTRACT

The disclosure provides a method and apparatus for controlling traffic transmission, a device, and a storage medium. A network bridge is arranged between a target container and a host, and traffic data is forwarded to an application layer detector for application layer traffic filtering by the network bridge, which can be compatible with various target containers having different service characteristics and improve stability of traffic transmission. A transmission layer traffic filtering strategy is directly applied to an interior of a container, and transmission layer traffic filtering is conducted in the container, such that a fault of a container cluster caused by a mistake or abnormality of a network protection strategy is prevented, and secure detection and normal transmission of the traffic data in a container environment are implemented.

17 Claims, 10 Drawing Sheets

(56) References Cited

U.S. PATENT DOCUMENTS

| | | |
|---|---|---|
| 2016/0099874 A1 | 4/2016 | Hu et al. |
| 2018/0278639 A1 | 9/2018 | Bernstein et al. |
| 2019/0058722 A1 | 2/2019 | Levin et al. |
| 2019/0230126 A1 | 7/2019 | Kumar et al. |
| 2019/0379579 A1 | 12/2019 | Mishra et al. |
| 2020/0329284 A1 | 10/2020 | Denoual et al. |
| 2021/0067538 A1 | 3/2021 | Mishra et al. |
| 2022/0021605 A1* | 1/2022 | Bagwell ............... H04L 45/586 |

FOREIGN PATENT DOCUMENTS

| | | |
|---|---|---|
| CN | 107864062 A | 3/2018 |
| CN | 108200038 A | 6/2018 |
| CN | 109981549 A | 7/2019 |
| CN | 114143203 A | 3/2022 |
| CN | 114237928 A | 3/2022 |
| CN | 114978610 A | 8/2022 |

OTHER PUBLICATIONS

Yang Xin et al.; "Docker Container Network Architecture Base on Macvlan"; Microcomputer Applications; vol. 32 No. 6; 2018; p. 58-60 and 64 (contains English Translation).

"Research on Docker container security protection technology"; https://lib.cgvip.com/Qikan/Article/Detail?id=7101403031&from=Qikan_Search_Index; Mar. 2020; accessed Aug. 13, 2024; 5 pages (contains English Translation).

* cited by examiner

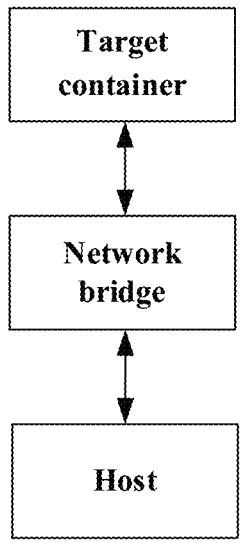

FIG. 1

Conduct, in response to traffic data generated by a target container, transmission layer traffic filtering on the traffic data based on a transmission layer traffic filtering strategy set in the target container, and determine the traffic data that has passed the transmission layer traffic filtering as first data — S201

Forward the first data to an application layer detector by a network bridge connected to the target container, conduct application layer traffic filtering on the first data by the application layer detector, and determine the traffic data that has passed the application layer traffic filtering as second data — S202

Transmit the second data to a host connected to the network bridge by the network bridge, and transmit the second data to a destination end corresponding to the second data by the host — S203

FIG. 2

TRAFFIC TRANSMISSION CONTROL METHOD, APPARATUS, DEVICE, AND STORAGE MEDIUM

CROSS-REFERENCE TO RELATED APPLICATION(S)

The disclosure a Continuation Application of International Patent Application No. PCT/CN2023/086761, filed Apr. 7, 2023, which claims the priority to Chinese Patent Application No. 202210468297.9, filed to the Chinese Patent Office on Apr. 29, 2022, and entitled "Traffic Transmission Control Method, Apparatus, Device, and Storage Medium", the disclosures of which are incorporated herein by reference in their entities.

FIELD

The disclosure relates to the technical field of internet, and particularly relates to a method and apparatus for controlling traffic transmission, a device, and a storage medium.

BACKGROUND

A container network is an open network structure. Generally, a network diversion and blocking solution uses a container network interface (CNI) plug-in component. The CNI plug-in component needs to match the container network. In this way, traffic data can be obtained, and corresponding security scanning and network strategy blocking can be conducted. This control method is mainly to filter the traffic data based on a protocol stack of a network of a host computer, so as to implement network isolation. This technical solution can satisfy service requirements of a single container network environment.

However, with development of a container technology, a mixed network mode has emerged. Traffic data of many containers no longer enter a protocol stack of a host, and flow directly to an external virtual switch by a physical network card of the host computer. If the CNI plug-in component is still used, invalid security scanning and network strategy blocking will be caused due to inability to obtain relevant traffic data, and further the traffic data will be possibly not divided and transmitted. These situations influence integrity of traffic data transmission and results of subsequent traffic detection of the traffic data, and reduce security and stability of the container environment.

SUMMARY

Examples of the disclosure at least provide a method, an apparatus, a device, and storage medium for controlling traffic transmission.

In a first aspect, an example of the disclosure provides a method for controlling traffic transmission. The method includes:
  conducting, in response to traffic data generated by a target container, transmission layer traffic filtering on the traffic data based on a transmission layer traffic filtering strategy set in the target container, and determining the traffic data that has passed the transmission layer traffic filtering as first data;
  forwarding the first data to an application layer detector by a network bridge connected to the target container, conducting application layer traffic filtering on the first data by the application layer detector, and determining the traffic data that has passed the application layer traffic filtering as second data; and
  transmitting the second data to a host connected to the network bridge by the network bridge, and transmitting the second data to a destination end corresponding to the second data by the host.

In an optional embodiment, before conducting transmission layer traffic filtering on the traffic data based on a transmission layer traffic filtering strategy set in the target container, the method further includes:
  obtaining the transmission layer traffic filtering strategy, corresponding to the target container, generated by a network policer, and transmitting the transmission layer traffic filtering strategy to the network bridge, where the transmission layer traffic filtering strategy indicates quintuple information that satisfies a transmission requirement and quintuple information that does not satisfy a transmission requirement; and
  setting the transmission layer traffic filtering strategy in an independent network namespace of the target container by the network bridge.

Conducting transmission layer traffic filtering on the traffic data based on a transmission layer traffic filtering strategy set in the target container includes:
  reading the transmission layer traffic filtering strategy from the independent network namespace, and conducting transmission layer traffic filtering on the traffic data based on quintuple information carried by the traffic data, and the quintuple information that satisfies the transmission requirement and the quintuple information that does not satisfy the transmission requirement that are indicated by the transmission layer traffic filtering strategy.

In an optional embodiment, the target container is set with a first network interface, and the host is set with a second network interface. The network bridge is set with a third network interface and a fourth network interface. The first network interface is communicatively connected with the third network interface, and the second network interface is communicatively connected with the fourth network interface.

Forwarding the first data to an application layer detector by a network bridge connected to the target container includes:
  receiving the first data transmitted by the first network interface of the target container by the third network interface of the network bridge connected to the target container, and invoking a packet forwarding function of the network bridge so as to forward the first data to the application layer detector.

Transmitting the second data to a host connected to the network bridge by the network bridge includes:
  forwarding the second data to the second network interface of the host connected to the network bridge by the fourth network interface of the network bridge.

In an optional embodiment, the conducting application layer traffic filtering on the first data by the application layer detector includes:
  invoking a traffic filtering model associated with the target container from a pre-trained traffic filtering model set by the application layer detector; and
  conducting application layer traffic filtering on the first data based on the invoked traffic filtering model.

In a second aspect, an example of the disclosure provides a method for controlling traffic transmission. The method includes:

forwarding, in response to traffic data received by a host, the traffic data to an application layer detector by a network bridge connected to the host, conducting application layer traffic filtering on the traffic data by the application layer detector to determine the traffic data that has passed the application layer traffic filtering as third data;

transmitting the third data to a target container connected to the network bridge by the network bridge, conducting transmission layer traffic filtering on the third data based on a transmission layer traffic filtering strategy set in the target container to determine the traffic data that has passed the transmission layer traffic filtering as fourth data; and processing the fourth data in the target container.

In an optional embodiment, the target container is set with a first network interface, and the host is set with a second network interface. The network bridge is set with a third network interface and a fourth network interface. The first network interface is communicatively connected with the third network interface, and the second network interface is communicatively connected with the fourth network interface.

Forwarding the traffic data to an application layer detector by a network bridge connected to the host includes:

receiving the traffic data transmitted by the second network interface of the host by the fourth network interface of the network bridge connected to the host, and invoking a packet forwarding function of the network bridge so as to forward the traffic data to the application layer detector.

Transmitting the third data to a target container connected to the network bridge by the network bridge includes:

forwarding the third data to the first network interface of the target container connected to the network bridge by the third network interface of the network bridge.

In an optional embodiment, conducting application layer traffic filtering on the traffic data by the application layer detector includes:

invoking a traffic filtering model associated with the target container from a pre-trained traffic filtering model set by the application layer detector; and conducting application layer traffic filtering on the traffic data based on the invoked traffic filtering model.

In an optional embodiment, before conducting transmission layer traffic filtering on the third data based on a transmission layer traffic filtering strategy set in the target container, the method further includes:

obtaining the transmission layer traffic filtering strategy, corresponding to the target container, generated by a network policer, and transmitting the transmission layer traffic filtering strategy to the network bridge, where the transmission layer traffic filtering strategy indicates quintuple information that satisfies a transmission requirement and quintuple information that does not satisfy a transmission requirement; and setting the transmission layer traffic filtering strategy in an independent network namespace of the target container by the network bridge.

Conducting transmission layer traffic filtering on the third data based on a transmission layer traffic filtering strategy set in the target container includes:

reading the transmission layer traffic filtering strategy from the independent network namespace, and conducting transmission layer traffic filtering on the third data based on quintuple information carried by the third data, and the quintuple information that satisfies the transmission requirement and the quintuple information that does not satisfy the transmission requirement that are indicated by the transmission layer traffic filtering strategy.

In a third aspect, an example of the disclosure further provides an apparatus for controlling traffic transmission. The apparatus includes:

a first filtering module configured to conduct, in response to traffic data generated by a target container, transmission layer traffic filtering on the traffic data based on a transmission layer traffic filtering strategy set in the target container, and determine the traffic data that has passed the transmission layer traffic filtering as first data;

a second filtering module configured to forward the first data to an application layer detector by a network bridge connected to the target container, conduct application layer traffic filtering on the first data by the application layer detector, and determine the traffic data that has passed the application layer traffic filtering as second data; and a first processing module configured to transmit the second data to a host connected to the network bridge by the network bridge, and transmit the second data to a destination end corresponding to the second data by the host.

In a fourth aspect, an example of the disclosure further provides an apparatus for controlling traffic transmission. The apparatus includes:

a third filtering module configured to forward, in response to traffic data received by a host, the traffic data to an application layer detector by a network bridge connected to the host, conduct application layer traffic filtering on the traffic data by the application layer detector, and determine the traffic data that has passed the application layer traffic filtering as third data;

a fourth filtering module configured to transmit the third data to a target container connected to the network bridge by the network bridge, conduct transmission layer traffic filtering on the third data based on a transmission layer traffic filtering strategy set in the target container, and determine the traffic data that has passed the transmission layer traffic filtering as fourth data; and a second processing module configured to process the fourth data in the target container.

In a fifth aspect, an example of the disclosure further provides an electronic device. The electronic device includes: a processor, a memory, and a bus. The memory stores a machine-readable instruction executable by the processor. When the electronic device runs, the processor is in communication with the memory by the bus. When the machine-readable instruction is executed by the processor, steps of the method for controlling traffic transmission according to the first aspect or any one of possible embodiments of the first aspect, or the second aspect or any one of possible embodiments of the second aspect are executed.

In a sixth aspect, an example of the disclosure further provides a computer-readable storage medium. The computer-readable storage medium stores a computer program. When a processor runs the computer program, steps of the method for controlling traffic transmission according to the first aspect or any one of possible embodiments of the first aspect, or the second aspect or any one of possible embodiments of the second aspect are executed.

Reference is made to the description of the above method for controlling traffic transmission for the effect description of the apparatus for controlling traffic transmission, the electronic device, and the computer-readable storage medium, which will not be repeated herein.

In the examples of the disclosure, in a case that the traffic data flows out of a container, the transmission layer traffic filtering strategy is directly applied to an interior of the container, and transmission layer traffic filtering is directly conducted on the traffic data generated by the container in the container, such that influence on a container cluster can be reduced, and a fault of the container cluster caused by a mistake or abnormality of a network protection strategy can be prevented. In addition, the network bridge is arranged between the target container and the host, and the target container may forward the traffic data that has passed transmission layer traffic filtering to the application layer detector for application layer traffic filtering by the network bridge, and then transmit the traffic data that has passed application layer traffic filtering to the host. Because the network bridge may be compatible with traffic data transmission of various containers having different service characteristics and has high adaptability, universality and robustness, stability and integrity of traffic transmission can be ensured, and further secure detection and normal transmission of the traffic data in a container environment can be implemented.

Accordingly, in a case that the traffic data flows into the container, after receiving the traffic data, the host forwards the traffic data to the application layer detector for application layer traffic filtering by the network bridge arranged between the host and the container, and then forwards the traffic data that has passed application layer traffic filtering to the container, and transmission layer traffic filtering is directly conducted through the transmission layer traffic filtering strategy set in the container. On one hand, through a mechanism of transmission layer traffic filtering in the container, influence on the container cluster can be reduced, and a fault of the container cluster caused by a mistake or abnormality of a network protection strategy can be prevented. On the other hand, because the network bridge arranged between the host and the container may be compatible with traffic data transmission of various containers having different service characteristics and has high adaptability, universality and robustness, stability and integrity of traffic transmission can be ensured, and further secure detection and normal transmission of the traffic data in a container environment can be implemented.

To make the objectives, features, and advantages of the disclosure clearer and more comprehensible, the disclosure will be described in detail below with reference to preferred examples and accompanying drawings.

BRIEF DESCRIPTION OF THE DRAWINGS

In order to describe technical solutions of examples of the disclosure more clearly, accompanying drawings required for the examples will be briefly introduced below. The drawings herein are incorporated in the description as a constituent part of the description, illustrate the examples conforming to the disclosure, and serve to describe the technical solutions of the disclosure together with the description. It should be understood that the following accompanying drawings illustrate only some examples of the disclosure and should not be construed as limitation on the scope. Those of ordinary skill in the art can still derive other related accompanying drawings from these accompanying drawings without creative efforts.

FIG. 1 is a schematic diagram of an application scene according to an example of the disclosure;

FIG. 2 is a flow diagram of a method for controlling traffic transmission according to an example of the disclosure;

DETAILED DESCRIPTION OF EMBODIMENTS

Figure 3:
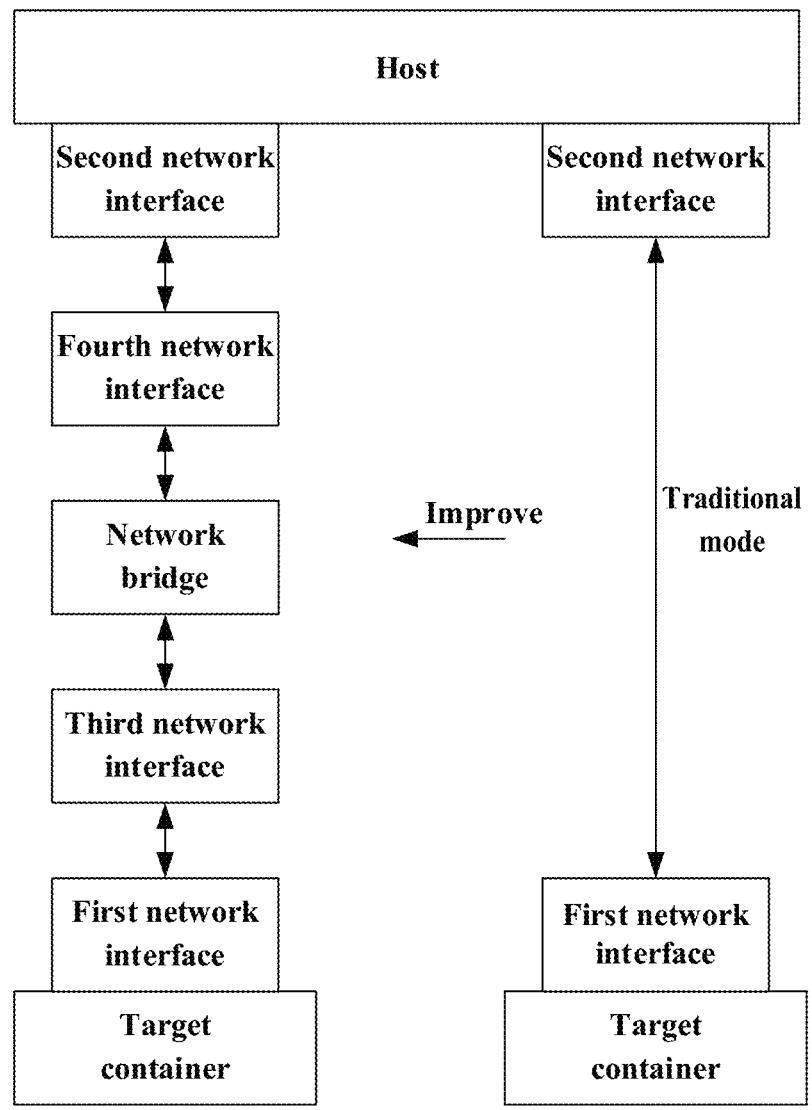
FIG. 3 is a schematic diagram of a network interface according to an example of the disclosure.

For making objectives, technical solutions and advantages of examples of the disclosure more obvious, the technical solutions in the examples of the disclosure will be clearly and completely described below in conjunction with the accompanying drawings in the examples of the disclosure. Obviously, the described examples are merely some examples rather than all examples of the disclosure. Generally, components of the examples of the disclosure described and shown in the accompanying drawings may be arranged and designed in various modes. Therefore, the following detailed description of the examples of the disclosure provided in the accompanying drawings is not intended to limit the protection scope of the disclosure, but is merely representative of selected examples of the disclosure. Based on the examples of the disclosure, all other examples obtained by those skilled in the art without making creative efforts fall within the protection scope of the disclosure.

It should be noted that like numerals and letters denote like items in the following accompanying drawings, and therefore, once an item is defined in one accompanying drawing, it does not need to be further defined and explained in the subsequent accompanying drawings.

When describing an association relation, the term "and/or" herein means that there may be three relations, for instance, A and/or B, which may mean that A exists alone, both A and B exist, or B exists alone. In addition, the term "at least one" herein indicates any one or any combination of at least two of multiple, for instance, including at least one of A, B and C, and may indicate including any one or more elements selected from a set of A, B and C.

It is found that a general network diversion and blocking solution is to use a container network interface (CNI)

plug-in component, that is, to use the CNI plug-in component matching a container network to obtain traffic data and conduct corresponding security scanning and network strategy blocking. However, the solution cannot satisfy traffic blocking and diversion requirements in a mixed network mode in a container environment, and the CNI plug-in component is far away from a container, such that transmitted traffic data is at a risk of integrity loss, which leads to distortion of the traffic data obtained. Further, results of subsequent traffic detection can be influenced, integrity of traffic data transmission can hardly be ensured, and security and stability of the container environment are influenced.

Based on the above research, the disclosure provides a method for controlling traffic transmission. A network bridge is arranged between a target container and a host, and traffic data is forwarded to an application layer detector for application layer traffic filtering by the network bridge, which can be compatible with various target containers having different service characteristics and improve stability of traffic transmission. A transmission layer traffic filtering strategy is directly applied to an interior of a container, and transmission layer traffic filtering is conducted in the container, such that a fault of a container cluster caused by a mistake or abnormality of a network protection strategy is prevented, and secure detection and normal transmission of the traffic data in a container environment are implemented.

In order to facilitate understanding of the example, firstly, a method for controlling traffic transmission according to the example of the disclosure will be introduced in detail. An execution entity of the method for controlling traffic transmission according to the example of the disclosure is generally a computer device having a certain computing capability. The computer device includes, for example, a terminal device, or a server, or other processing devices. In some possible embodiments, the method for controlling traffic transmission may be implemented by enabling a processor to invoke a computer-readable instruction stored in a memory.

The method for controlling traffic transmission according to the example of the disclosure will be illustrated below.

With reference to FIG. 1, FIG. 1 is a schematic diagram of an application scene according to an example of the disclosure. As shown in FIG. 1, in order to conduct traffic filtering and transmission control on traffic data transmitted from a target container to a host and traffic data transmitted from the host to the target container, a network bridge may be arranged between the target container and the host, such that data transmission between the target container and the host may be conducted by the network bridge, and further the traffic data may be forwarded to an application layer detector for application layer traffic filtering through a packet forwarding function of the network bridge. In this way, stability of traffic transmission may be improved, and normal traffic transmission in a container environment can be ensured.

With reference to FIG. 2, FIG. 2 is a flow diagram of a method for controlling traffic transmission according to an example of the disclosure. The method for controlling traffic transmission may be considered to be executed by a network traffic controller. The network traffic controller may be arranged on an independent computer device or a host for network traffic processing according to the example of the disclosure. As shown in FIG. 2, the method for controlling traffic transmission according to the example of the disclosure includes S201-S203.

S201: in response to traffic data generated by a target container, transmission layer traffic filtering is conducted on the traffic data based on a transmission layer traffic filtering strategy set in the target container, and the traffic data that has passed the transmission layer traffic filtering is determined as first data.

Herein, the traffic data is data generated by the target container based on a network transmission protocol and to be transmitted to another container or host. In the step, in response to detecting the traffic data generated by the target container, transmission layer traffic filtering is conducted on the traffic data according to the traffic filtering strategy set in the target container. Traffic data that has not passed transmission layer traffic filtering is intercepted, and the traffic data that has passed transmission layer traffic filtering is determined as the first data and released.

The transmission layer traffic filtering is a four-layer traffic filtering. The four-layer traffic filtering refers to filtering and protecting traffic data based on the quintuple information in a fourth transmission layer of an open system interconnection reference model (OSI).

Herein, the quintuple information includes a source internet protocol (IP) address, a source port, a destination IP address, a destination port, and a transmission layer protocol.

It may be understood that the transmission layer traffic filtering is to obtain the quintuple information carried by the traffic data, and to obtain the quintuple information that satisfies the transmission requirement and the quintuple information that does not satisfy the transmission requirement that are indicated by the transmission layer traffic filtering strategy, so as to detect whether the quintuple information of the traffic data satisfies the transmission requirement indicated by the transmission layer traffic filtering strategy.

Herein, in order to conduct transmission layer traffic filtering on the traffic data in the target container, the corresponding transmission layer traffic filtering strategy needs to be preset in the target container.

Accordingly, in some possible embodiments, before transmission layer traffic filtering is conducted on the traffic data based on the transmission layer traffic filtering strategy set in the target container, the method further includes the following steps:

the transmission layer traffic filtering strategy, corresponding to the target container, generated by a network policer is obtained, and the transmission layer traffic filtering strategy is transmitted to the network bridge, where the transmission layer traffic filtering strategy indicates quintuple information that satisfies a transmission requirement and quintuple information that does not satisfy a transmission requirement; and the transmission layer traffic filtering strategy is set in an independent network namespace of the target container by the network bridge.

In the step, the transmission layer traffic filtering strategy generated by the network policer may be obtained. Herein, the transmission layer traffic filtering strategy corresponds to the target container, such that transmission layer traffic filtering is conducted on the traffic data generated by the target container according to the transmission layer traffic filtering strategy. In a case that the transmission layer traffic filtering strategy is obtained, the transmission layer traffic filtering strategy may be transmitted to the network bridge, and the transmission layer traffic filtering strategy may be set in the independent network namespace of the target container by the network bridge.

Optionally, the transmission layer traffic filtering strategy may be generated based on a network access interface rule set for secure transmission. The transmission layer traffic filtering strategy indicates accessible and inaccessible cases of the target container, that is, indicates the quintuple information that satisfies the transmission requirement and the quintuple information that does not satisfy the transmission requirement. For instance, for traffic data generated by target container A and accessing container B, the transmission layer traffic filtering strategy indicates that the container A cannot access a port 3306 of the container B, such that quintuple information corresponding to an access process of assessing the port 3306 of the container B by the container A is quintuple information that is indicated by the transmission layer traffic filtering strategy and does not satisfy the transmission requirement.

After the transmission layer traffic filtering strategy is set in the independent network namespace of the target container, the transmission layer traffic filtering strategy may be read from the independent network namespace, and transmission layer traffic filtering may be conducted on the traffic data according to the transmission layer traffic filtering strategy.

Therefore, in some possible embodiments, the step that transmission layer traffic filtering is conducted on the traffic data based on the transmission layer traffic filtering strategy set in the target container includes the following steps:

the transmission layer traffic filtering strategy is read from the independent network namespace, and transmission layer traffic filtering is conducted on the traffic data based on quintuple information carried by the traffic data, and the quintuple information that satisfies the transmission requirement and the quintuple information that does not satisfy the transmission requirement that are indicated by the transmission layer traffic filtering strategy.

It may be understood that if the quintuple information carried by the traffic data matches the quintuple information, indicated by the transmission layer traffic filtering strategy, that satisfies the transmission requirement, it may be determined that the traffic data has passed transmission layer traffic filtering, such that the traffic data may be released. On the contrary, if the quintuple information carried by the traffic data matches the quintuple information, indicated by the transmission layer traffic filtering strategy, that does not satisfy the transmission requirement, it may be determined that the traffic data has not passed transmission layer traffic filtering, such that the traffic data may be intercepted and filtered.

S202: the first data is forwarded to an application layer detector by a network bridge connected to the target container, application layer traffic filtering is conducted on the first data by the application layer detector, and the traffic data that has passed the application layer traffic filtering is determined as second data.

In the step, the first data that has passed transmission layer traffic filtering may be transmitted from the target container to the network bridge, and then forwarded to the application layer detector by the network bridge, such that the first data may pass application layer traffic filtering by the application layer detector. The first data that has not passed application layer traffic filtering is intercepted, and the first data that has passed application layer traffic filtering is determined as the second data and released.

Transmission of the traffic data between virtual network devices requires use of network interfaces. All the network interfaces appear in pairs. One ends of the network interfaces are connected to corresponding virtual network devices, and the other ends of network interfaces are connected to each other.

Further, in some possible embodiments, the target container is set with a first network interface, and the host is set with a second network interface. The network bridge is set with a third network interface and a fourth network interface. The first network interface is communicatively connected with the third network interface, and the second network interface is communicatively connected with the fourth network interface.

Meanwhile, with reference to FIG. 3, FIG. 3 is a schematic diagram of a network interface according to an example of the disclosure. As shown in FIG. 3, a traditional mode is to generate a pair of network interfaces. One of the network interfaces is arranged on the target container, and the other of the network interfaces is arranged on the host. That is, as shown in FIG. 3, the target container is set with the first network interface, the host is set with the second network interface, the first network interface is communicatively connected with the second network interface, and the traffic data generated by the target container is transmitted to the second network interface of the host by the first network interface.

In the example, in a case that the target container is set with the first network interface and the host is set with the second network interface, the network bridge is added. The network bridge is set with the third network interface and the fourth network interface. The first network interface is communicatively connected with the third network interface, and the second network interface is communicatively connected with the fourth network interface, such that the traffic data generated by the target container may be transmitted to the host by the network bridge.

Accordingly, in some possible embodiments, the step that the first data is forwarded to the application layer detector by the network bridge connected to the target container includes the following steps:

the first data transmitted by the first network interface of the target container is received by the third network interface of the network bridge connected to the target container, and a packet forwarding function of the network bridge is invoked so as to forward the first data to the application layer detector.

In the step, the first network interface is communicatively connected with the third network interface, such that the first data transmitted by the first network interface of the target container may be received by the third network interface of the network bridge, and the first data may be transmitted from the target container to the network bridge. Further, the packet forwarding function of the network bridge is invoked so as to forward the first data to the application layer detector, such that application layer traffic filtering is conducted on the first data by the application layer detector.

Herein, the application layer traffic filtering is a seven-layer traffic filtering. The seven-layer traffic filtering refers to identifying and filtering the traffic data according to a service rule of an application layer in a seventh transmission layer of an open system interconnection reference model (OSI).

Specifically, in some possible embodiments, the step that application layer traffic filtering is conducted on the first data by the application layer detector includes the following steps:

a traffic filtering model associated with the target container is invoked from a pre-trained traffic filtering model set by the application layer detector; and application layer traffic filtering is conducted on the first data based on the traffic filtering model invoked.

For the pre-trained traffic filtering model set, the traffic filtering model set includes a plurality of traffic filtering models, and each traffic filtering model stores a corresponding service container, such that the traffic filtering model associated with the target container may be invoked from the traffic filtering model set by the application layer detector. In this way, application layer traffic filtering is conducted on the first data based on the invoked traffic filtering model.

Herein, based on the packet forwarding function of the network bridge, conversion between a kernel mode and a user mode may be implemented.

Specifically, a memory-mapped file (mmap) method may be used. A mmap mechanism is a duplex communication mechanism, and may be used to operate data transfer and sharing between kernel mode and user mode communication processes, that is, both sides read and write data in a same memory space, so as to complete communication.

Figure 4:
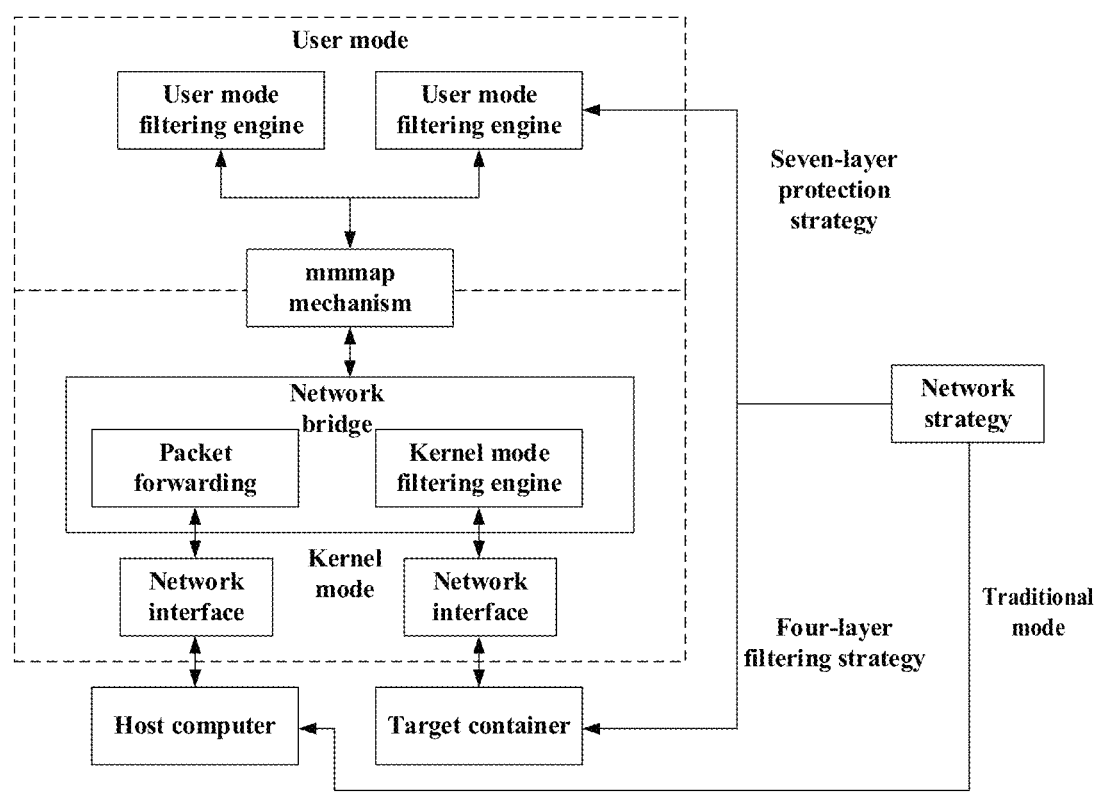
FIG. 4 is a schematic diagram of a packet forwarding process according to an example of the disclosure.

Meanwhile, with reference to FIG. 4, FIG. 4 is a schematic diagram of a packet forwarding process according to an example of the disclosure. As shown in FIG. 4, a traditional mode is to transmit a transmission layer traffic filtering strategy (that is, a four-layer filtering strategy in the figure) generated by a network policer directly to a host computer of a target container, and conduct transmission layer traffic filtering by a protocol stack of the host computer. However, in the example, the transmission layer traffic filtering strategy is directly applied to an interior of the target container, and transmission layer traffic filtering is conducted on traffic data, such that influence on a container cluster, and the container cluster is prevented from having a fault caused by a mistake or abnormality of a network protection strategy. Meanwhile, the traffic data may also be forwarded to an application layer detector for application layer traffic filtering through a packet forwarding function of a network bridge. As shown in FIG. 4, a seven-layer protection strategy is applied to a user mode filtering engine, and application layer traffic filtering is conducted on the traffic data. The network bridge may be compatible with various target containers having different service characteristics. In this way, stability of traffic transmission is improved, integrity of the traffic data received is improved, and secure detection and normal transmission of the traffic data in a container environment are implemented.

Specifically, first data transmitted by a first network interface of the target container is received by a third network interface of the network bridge. In this case, the first data is in a kernel mode process. The first data may be transferred to a user mode process based on a mmap mechanism, application layer traffic filtering is conducted in the user mode process, and detection result information is generated. Herein, the detection result information does not include data information, and includes a determination result of whether the first data has passed application layer traffic filtering. In this case, based on the mmap mechanism, the detection result information may be transferred to the kernel mode process, and the data may be intercepted or released in the kernel mode process. If the traffic data has not passed application layer traffic filtering, the traffic data is filtered by a kernel mode filtering engine, that is, the data is intercepted. On the contrary, if the traffic data has passed application layer traffic filtering, the data is released.

S203: second data is transmitted to a host connected to the network bridge by the network bridge, and the second data is transmitted to a destination end corresponding to the second data by the host.

In the step, after the second data that has passed application layer traffic filtering is obtained, the second data may be transmitted to the host with a network interface by the network bridge. Herein, the second data carries a network link received, and is transmitted to the destination end corresponding to the second data by the host according to the network link carried by the second data.

It may be seen from the above description that a second network interface is communicatively connected with a fourth network interface. Therefore, in some possible embodiments, the step that the second data is transmitted to the host connected to the network bridge by the network bridge includes the following step:

the second data is forwarded to the second network interface of the host connected to the network bridge by the fourth network interface of the network bridge.

In the step, the second network interface is communicatively connected with the fourth network interface, such that the second data may be forwarded to the second network interface of the host by the fourth network interface of the network bridge, and the second data that has passed application layer traffic filtering may be transmitted from the network bridge to the host.

Figure 5:
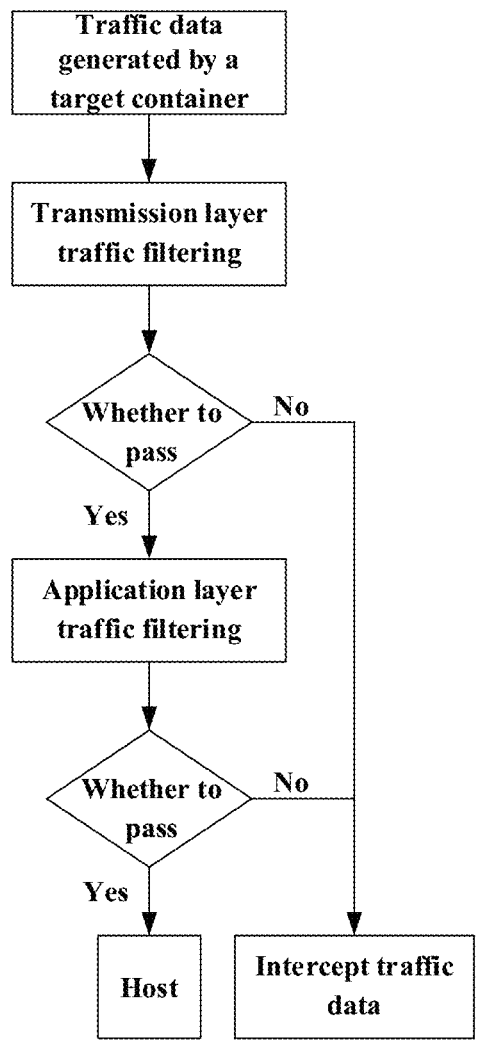
FIG. 5 is a flow diagram of another method for controlling traffic transmission according to an example of the disclosure.

With reference to FIG. 5, FIG. 5 is a flow diagram of another method for controlling traffic transmission according to an example of the disclosure. As shown in FIG. 5, in a case that traffic data flows out of a container, traffic data generated by a target container passed transmission layer traffic filtering according to a transmission layer traffic filtering strategy set in the target container, then first data that has passed transmission layer traffic filtering is obtained, the first data is released, and the traffic data has not passed transmission layer traffic filtering is intercepted and filtered. Then, the first data is forwarded to an application layer detector for application layer traffic filtering by a network bridge, second data that has passed application layer traffic filtering is obtained, the second data is released, the first data has not passed application layer traffic filtering is intercepted and filtered, and then the second data is transmitted to a host by the network bridge and is transmitted to a destination end corresponding to the second data by the host.

In the method for controlling traffic transmission according to the example of the disclosure, in response to the traffic data generated by the target container, transmission layer traffic filtering may be conducted on the traffic data based on the transmission layer traffic filtering strategy set in the target container, and the traffic data that has passed the transmission layer traffic filtering may be used as the first data; the first data may be forwarded to the application layer detector by the network bridge connected to the target container, application layer traffic filtering may be conducted on the first data by the application layer detector, and the traffic data that has passed the application layer traffic filtering may be used as the second data; and the second data may be transmitted to the host connected to the network bridge by the network bridge, and the second data may be transmitted to the destination end corresponding to the second data by the host.

In this way, in a case that the traffic data flows out of the container, the transmission layer traffic filtering strategy is directly applied to an interior of the container, and transmission layer traffic filtering is directly conducted on the traffic data generated by the container in the container, such that influence on a container cluster can be reduced, and a fault of the container cluster caused by a mistake or abnormality of a network protection strategy can be prevented. In addition, the network bridge is arranged between the target container and the host, and the target container may forward the traffic data that has passed transmission layer traffic filtering to the application layer detector for application layer traffic filtering by the network bridge, and then transmit the traffic data that has passed application layer traffic filtering to the host. Because the network bridge may be compatible with traffic data transmission of various containers having different service characteristics and has high adaptability, universality and robustness, stability and integrity of traffic transmission can be ensured, and further secure detection and normal transmission of the traffic data in a container environment can be implemented.

Figure 6:
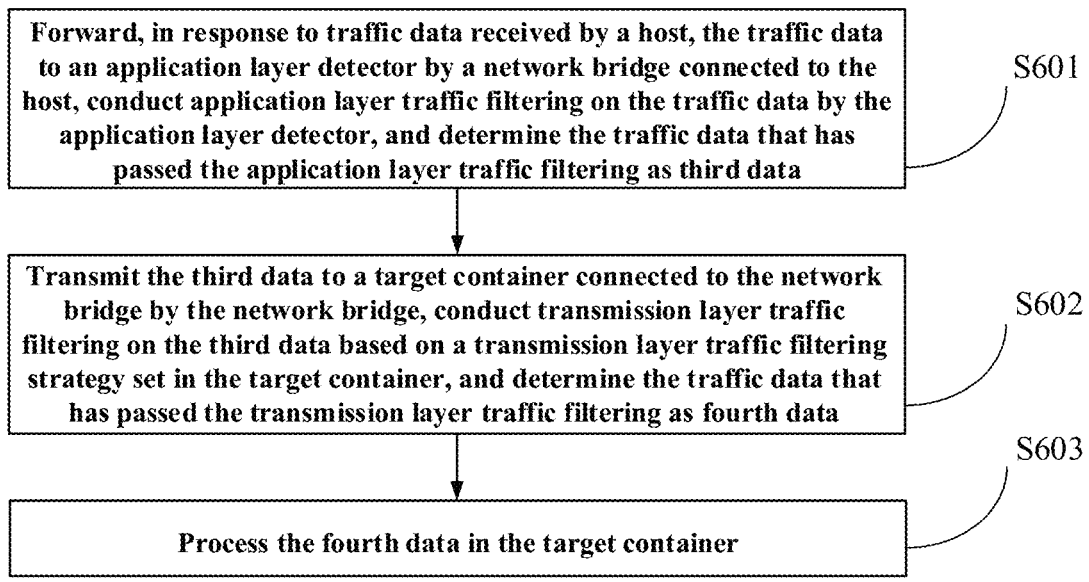
FIG. 6 is a flow diagram of yet another method for controlling traffic transmission according to an example of the disclosure.

With reference to FIG. 6, FIG. 6 is a flow diagram of yet another method for controlling traffic transmission according to an example of the disclosure. The method for controlling traffic transmission may be considered to be executed by a network traffic controller. The network traffic controller may be arranged on an independent computer device or a host for network traffic processing according to the example of the disclosure. As shown in FIG. 6, the method for controlling traffic transmission according to the example of the disclosure includes S601-S603.

S601: in response to traffic data received by a host, the traffic data is forwarded to an application layer detector by a network bridge connected to the host, application layer traffic filtering is conducted on the traffic data by the application layer detector, and the traffic data that has passed the application layer traffic filtering is used as third data.

Herein, the traffic data characterizes traffic data received by the host, generated based on a network transmission protocol and to be transmitted to a container. In the step, in response to detecting that the host receives the traffic data, application layer traffic filtering is conducted on the traffic data. Specifically, the traffic data is transmitted from the host to the network bridge, and then the traffic data is forwarded to the application layer detector for application layer traffic filtering by the network bridge.

The application layer traffic filtering is a seven-layer traffic filtering. The seven-layer traffic filtering refers to identifying and filtering the traffic data according to a service rule of an application layer in a seventh transmission layer of an open system interconnection reference model (OSI).

It may be understood that the application layer traffic filtering is to detect whether service information carried by the traffic data satisfies a transmission requirement according to a service rule of an application layer. Herein, the service information carried by the traffic data may include a uniform resource locator (URL) address, request body parameter information, etc.

Herein, it may be seen from the above description that transmission of the traffic data between virtual network devices requires use of network interfaces. All the network interfaces appear in pairs. One ends of the network interfaces are connected to corresponding virtual network devices, and the other ends of network interfaces are connected to each other.

Further, in some possible embodiments, the target container is set with a first network interface, and the host is set with a second network interface. The network bridge is set with a third network interface and a fourth network interface. The first network interface is communicatively connected with the third network interface, and the second network interface is communicatively connected with the fourth network interface.

Specifically, with reference to FIG. 3, FIG. 3 is a schematic diagram of a network interface according to an example of the disclosure. As shown in FIG. 3, a traditional mode is to generate a pair of network interfaces. One of the network interfaces is arranged on the target container, and the other of the network interfaces is arranged on the host. That is, as shown in the figure, the target container is set with the first network interface, the host is set with the second network interface, the first network interface is communicatively connected with the second network interface, and the traffic data received by the host is transmitted to the first network interface of the target container by the second network interface.

In the example, in a case that the target container is set with the first network interface and the host is set with the second network interface, the network bridge is added. The network bridge is set with the third network interface and the fourth network interface. The first network interface is communicatively connected with the third network interface, and the second network interface is communicatively connected with the fourth network interface, such that the traffic data received by the host may be transmitted to the target container by the network bridge.

Accordingly, in some possible embodiments, the step that the traffic data is forwarded to the application layer detector by the network bridge connected to the host includes the following steps:

the traffic data transmitted by the second network interface of the host is received by the fourth network interface of the network bridge connected to the host, and a packet forwarding function of the network bridge is invoked so as to forward the traffic data to the application layer detector.

In the step, since the second network interface is communicatively connected with the fourth network interface, such that the traffic data transmitted by the second network interface of the host may be received by the fourth network interface of the network bridge, and the traffic data may be transmitted from the host to the network bridge. In a case that the network bridge receives the traffic data, the packet forwarding function of the network bridge may be invoked so as to forward the traffic data to the application layer detector, such that application layer traffic filtering is conducted on the traffic data by the application layer detector.

Specifically, in some possible embodiments, the step that application layer traffic filtering is conducted on the traffic data by the application layer detector includes the following steps:

a traffic filtering model associated with the target container is invoked from a pre-trained traffic filtering model set by the application layer detector; and
application layer traffic filtering is conducted on the traffic data based on the traffic filtering model invoked.

For the pre-trained traffic filtering model set, the traffic filtering model set includes a plurality of traffic filtering models, and each traffic filtering model stores a corresponding service container, such that the traffic filtering model associated with the target container may be invoked from the traffic filtering model set by the application layer detector. In this way, application layer traffic filtering is conducted on the traffic data based on the traffic filtering model invoked.

Herein, based on the packet forwarding function of the network bridge, conversion between a kernel mode and a user mode may be implemented.

Specifically, a memory-mapped file (mmap) method may be used. A mmap mechanism is a duplex communication mechanism, and may be used to operate data transfer and sharing between kernel mode and user mode communication processes, that is, both sides read and write data in a same memory space, so as to complete communication.

Specifically, with reference to FIG. 4, FIG. 4 is a schematic diagram of a packet forwarding process according to an example of the disclosure. As shown in FIG. 4, a traditional mode is to transmit a transmission layer traffic filtering strategy (that is, a four-layer filtering strategy in the figure) generated by a network policer directly to a host computer of a target container, and conduct transmission layer traffic filtering by a protocol stack of the host computer. However, in the example, the transmission layer traffic filtering strategy is directly applied to an interior of the target container, and transmission layer traffic filtering is conducted on traffic data, such that influence on a container cluster, and the container cluster is prevented from having a fault caused by a mistake or abnormality of a network protection strategy. Meanwhile, the traffic data may also be forwarded to an application layer detector for application layer traffic filtering through a packet forwarding function of a network bridge. As shown in FIG. 4, a seven-layer protection strategy is applied to a user mode filtering engine, and application layer traffic filtering is conducted on the traffic data. The network bridge may be compatible with various target containers having different service characteristics. In this way, stability of traffic transmission is improved, integrity of the traffic data received is improved, and secure detection and normal transmission of the traffic data in a container environment are implemented.

Specifically, traffic data transmitted by a second network interface of the host is received by a fourth network interface of the network bridge. In this case, the traffic data is in a kernel mode process. The traffic data may be transferred to a user mode process based on a mmap mechanism, application layer traffic filtering is conducted in the user mode process, and detection result information is generated. Herein, the detection result information does not include data information, and includes a determination result of whether the traffic data has passed application layer traffic filtering. In this case, based on the mmap mechanism, the detection result information may be transferred to the kernel mode process, and the data may be intercepted or released in the kernel mode process. If the traffic data did not pass application layer traffic filtering, the traffic data is filtered by a kernel mode filtering engine, that is, the data is intercepted. On the contrary, if the traffic data did not pass the application layer traffic filtering, the data is released.

S602: the third data is transmitted to the target container connected to the network bridge by the network bridge, transmission layer traffic filtering is conducted on the third data based on the transmission layer traffic filtering strategy set in the target container, and the traffic data that has passed the transmission layer traffic filtering is used as fourth data.

In the step, after the third data that has passed application layer traffic filtering is obtained, the third data may be transmitted to the target container by the network bridge similarly with the network interface, such that transmission layer traffic filtering is conducted on the third data according to the transmission layer traffic filtering strategy set in the target container. Third data that has not passed transmission layer traffic filtering is intercepted, and the third data that has passed transmission layer traffic filtering is determined as the fourth data and released.

The transmission layer traffic filtering is a four-layer traffic filtering. The four-layer traffic filtering refers to filtering and protecting traffic data based on the quintuple information in a fourth transmission layer of an open system interconnection reference model (OSI).

Herein, the quintuple information includes a source internet protocol (IP) address, a source port, a destination IP address, a destination port, and a transmission layer protocol.

It may be understood that the transmission layer traffic filtering is to obtain the quintuple information carried by the third data, and to obtain the quintuple information that satisfies the transmission requirement and the quintuple information that does not satisfy the transmission requirement that are indicated by the transmission layer traffic filtering strategy, so as to detect whether the quintuple information of the third data satisfies the transmission requirement indicated by the transmission layer traffic filtering strategy.

It may be seen from the above description that a first network interface is communicatively connected with a third network interface. Therefore, in some possible embodiments, the step that the third data is transmitted to the target container connected to the network bridge by the network bridge includes the following step:

the third data is forwarded to the first network interface of the target container connected to the network bridge by the third network interface of the network bridge.

In the step, the first network interface is communicatively connected with the third network interface, such that the third data may be forwarded to the first network interface of the target container by the third network interface of the network bridge, and the third data may further pass transmission layer traffic filtering based on the transmission layer traffic filtering strategy set in the target container.

It may be understood that in order to conduct transmission layer traffic filtering on the third data in the target container, the corresponding transmission layer traffic filtering strategy needs to be preset in the target container.

Accordingly, in some possible embodiments, before transmission layer traffic filtering is conducted on the third data based on the transmission layer traffic filtering strategy set in the target container, the method further includes the following steps:

the transmission layer traffic filtering strategy, corresponding to the target container, generated by a network policer is obtained, and the transmission layer traffic filtering strategy is transmitted to the network bridge, where the transmission layer traffic filtering strategy indicates quintuple information that satisfies a transmission requirement and quintuple information that does not satisfy a transmission requirement; and the transmission layer traffic filtering strategy is set in an independent network namespace of the target container by the network bridge.

In the step, the transmission layer traffic filtering strategy generated by the network policer may be obtained. Herein, the transmission layer traffic filtering strategy corresponds to the target container, such that transmission layer traffic filtering is conducted on the traffic data received by the target container according to the transmission layer traffic filtering strategy. In a case that the transmission layer traffic filtering strategy is obtained, the transmission layer traffic filtering strategy may be transmitted to the network bridge, and the transmission layer traffic filtering strategy may be set in the independent network namespace of the target container by the network bridge.

After the transmission layer traffic filtering strategy is set in the independent network namespace of the target container, the transmission layer traffic filtering strategy may be read from the independent network namespace, and transmission layer traffic filtering may be conducted on the traffic data according to the transmission layer traffic filtering strategy.

Therefore, in some possible embodiments, the step that transmission layer traffic filtering is conducted on the third data based on the transmission layer traffic filtering strategy set in the target container includes the following steps:

the transmission layer traffic filtering strategy is read from the independent network namespace, and transmission layer traffic filtering is conducted on the third data based on quintuple information carried by the third data, and the quintuple information that satisfies the transmission requirement and the quintuple information that does not satisfy the transmission requirement that are indicated by the transmission layer traffic filtering strategy.

It may be understood that if the quintuple information carried by the third data matches the quintuple information, indicated by the transmission layer traffic filtering strategy, that satisfies the transmission requirement, it may be determined that the third data is passed transmission layer traffic filtering, such that the third data may be released. On the contrary, if the quintuple information carried by the third data matches the quintuple information, indicated by the transmission layer traffic filtering strategy, that does not satisfy the transmission requirement, it may be determined that the third data does not pass transmission layer traffic filtering, such that the third data may be intercepted and filtered.

S603: the fourth data is processed in the target container.

In the step, in response to determining the fourth data that has passed transmission layer traffic filtering, the fourth data received by the target container may be processed in a corresponding service process of the target container.

Figure 7:
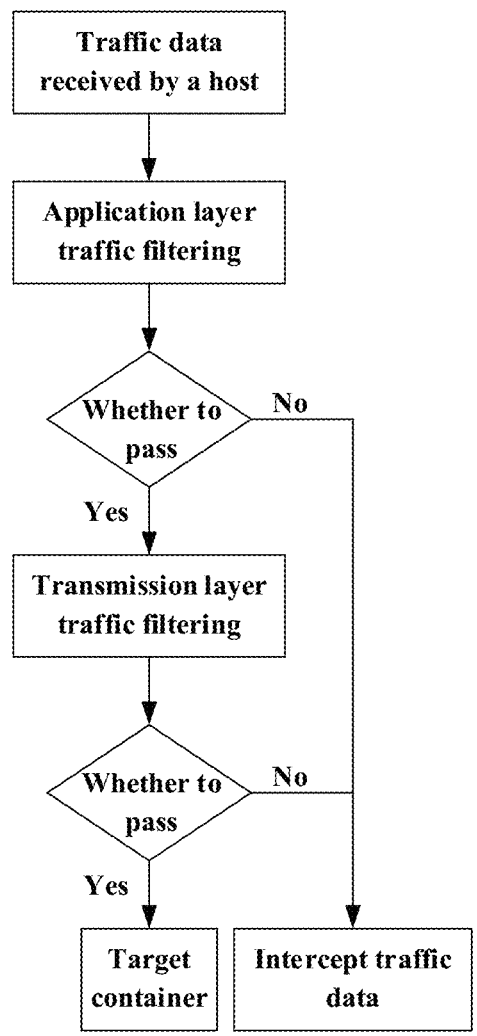
FIG. 7 is a flow diagram of still another method for controlling traffic transmission according to an example of the disclosure.

With reference to FIG. 7, FIG. 7 is a flow diagram of still another method for controlling traffic transmission according to an example of the disclosure. As shown in FIG. 7, in a case that traffic data flows into a container, traffic data received by a host is forwarded to an application layer detector for application layer traffic filtering by a network bridge, then third data that has passed application layer traffic filtering is obtained, the third data is released, and the traffic data that did not pass by application layer traffic filtering is intercepted and filtered. Then, the third data is transmitted to a target container by the network bridge, the third data passed transmission layer traffic filtering according to a transmission layer traffic filtering strategy set in the target container, and fourth data that has passed transmission layer traffic filtering is obtained. The fourth data is released, the third data that has not passed transmission layer traffic filtering is intercepted and filtered, and then the fourth data is processed in the target container.

In the method for controlling traffic transmission according to the example of the disclosure, in response to the traffic data received by the host, the traffic data may be forwarded to the application layer detector by the network bridge connected to the host, application layer traffic filtering may be conducted on the traffic data by the application layer detector, and the traffic data that has passed the application layer traffic filtering may be used as the third data; the third data may be transmitted to the target container connected to the network bridge by the network bridge, transmission layer traffic filtering may be conducted on the third data based on the transmission layer traffic filtering strategy set in the target container, and the traffic data that has passed the transmission layer traffic filtering may be used as the fourth data; and the fourth data is processed in the target container.

In this way, after receiving the traffic data, the host forwards the traffic data to the application layer detector for application layer traffic filtering by the network bridge arranged between the host and the container, and then forwards the traffic data that has passed application layer traffic filtering to the container, and transmission layer traffic filtering is directly conducted through the transmission layer traffic filtering strategy set in the container. On one hand, through a mechanism of transmission layer traffic filtering in the container, influence on the container cluster can be reduced, and a fault of the container cluster caused by a mistake or abnormality of a network protection strategy can be prevented. On the other hand, because the network bridge arranged between the host and the container may be compatible with traffic data transmission of various containers having different service characteristics and has high adaptability, universality and robustness, stability and integrity of traffic transmission can be ensured, and further secure detection and normal transmission of the traffic data in a container environment can be implemented.

It may be understood by those skilled in the art that in the above method of specific embodiments, a writing order of all the steps does not indicate a strict execution order and does not constitute any limitation on an implementation process, and a specific execution order of each step should be determined according to corresponding function and possible internal logic.

Based on the same inventive concept, an example of the disclosure further provides an apparatus for controlling traffic transmission corresponding to the method for controlling traffic transmission. A problem solving principle of the apparatus in the example of the disclosure is similar to that of the above method for controlling traffic transmission in the example of the disclosure, so reference may be made to implementation of the method for implementation of the apparatus, which will not be repeated herein.

Figure 8:
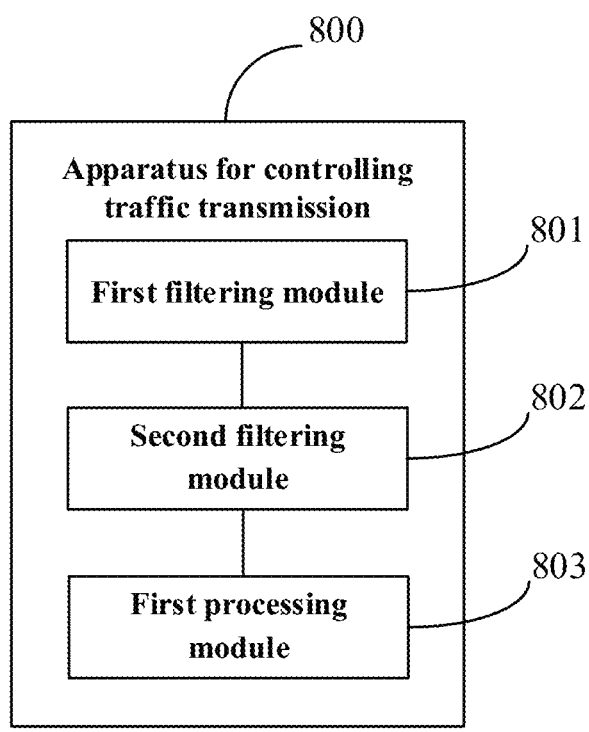
FIG. 8 is a first schematic diagram of an apparatus for controlling traffic transmission according to an example of the disclosure.
Figure 9:
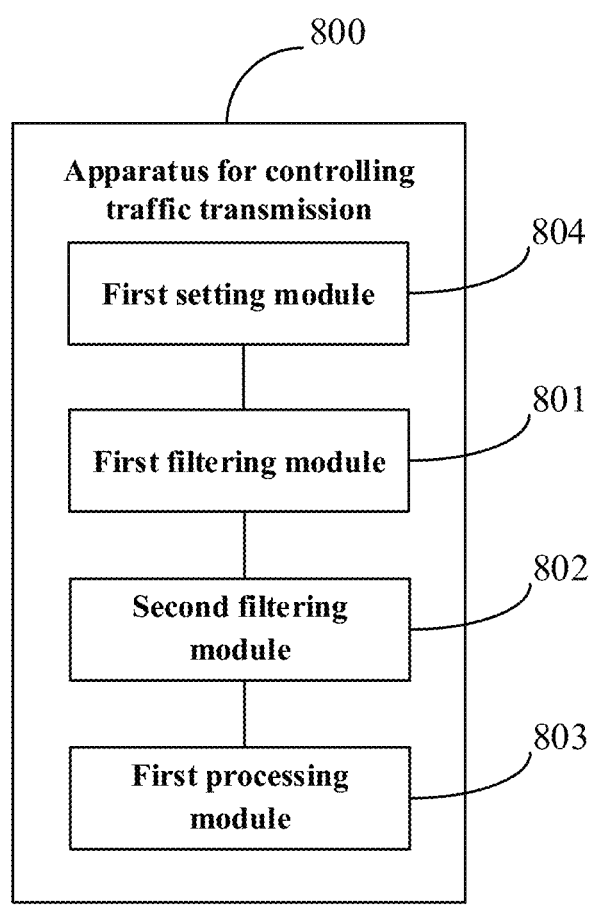
FIG. 9 is a second schematic diagram of an apparatus for controlling traffic transmission according to an example of the disclosure.

With reference to FIGS. 8 and 9, FIG. 8 is a first schematic diagram of an apparatus for controlling traffic transmission according to an example of the disclosure; and FIG. 9 is a second schematic diagram of an apparatus for controlling traffic transmission according to an example of the disclosure. As shown in FIG. 8, the apparatus 800 for controlling traffic transmission according to the example of the disclosure includes:

a first filtering module 801 configured to conduct, in response to traffic data generated by a target container, transmission layer traffic filtering on the traffic data based on a transmission layer traffic filtering strategy set in the target container, and determine the traffic data that has passed the transmission layer traffic filtering as first data;

a second filtering module 802 configured to forward the first data to an application layer detector by a network bridge connected to the target container, conduct application layer traffic filtering on the first data by the application layer detector, and determine the traffic data that has passed the application layer traffic filtering as second data; and a first processing module 803 configured to transmit the second data to a host connected to the network bridge by the network bridge, and transmit the second data to a destination end corresponding to the second data by the host.

In an optional embodiment, as shown in FIG. 9, the apparatus 800 for controlling traffic transmission further includes a first setting module 804. The first setting module 804 is configured to:

obtain the transmission layer traffic filtering strategy, corresponding to the target container, generated by a network policer, and transmit the transmission layer traffic filtering strategy to the network bridge, where the transmission layer traffic filtering strategy indicates quintuple information that satisfies a transmission requirement and quintuple information that does not satisfy a transmission requirement; and set the transmission layer traffic filtering strategy in an independent network namespace of the target container by the network bridge.

When conducting transmission layer traffic filtering on the traffic data based on the transmission layer traffic filtering strategy set in the target container, the first filtering module 801 is specifically configured to:

read the transmission layer traffic filtering strategy from the independent network namespace, and conduct transmission layer traffic filtering on the traffic data based on quintuple information carried by the traffic data, and the quintuple information that satisfies the transmission requirement and the quintuple information that does not satisfy the transmission requirement that are indicated by the transmission layer traffic filtering strategy.

In an optional embodiment, the target container is set with a first network interface, and the host is set with a second network interface. The network bridge is set with a third network interface and a fourth network interface. The first network interface is communicatively connected with the third network interface, and the second network interface is communicatively connected with the fourth network interface.

When forwarding the first data to the application layer detector by the network bridge connected to the target container, the second filtering module 802 is specifically configured to:

receive the first data transmitted by the first network interface of the target container by the third network interface of the network bridge connected to the target container, and invoke a packet forwarding function of the network bridge so as to forward the first data to the application layer detector.

When transmitting the second data to the host connected to the network bridge by the network bridge, the first processing module 803 is specifically configured to:

forward the second data to the second network interface of the host connected to the network bridge by the fourth network interface of the network bridge.

In an optional embodiment, when conducting application layer traffic filtering on the first data by the application layer detector, the second filtering module 802 is specifically configured to:

invoke a traffic filtering model associated with the target container from a pre-trained traffic filtering model set by the application layer detector.

Figure 10:
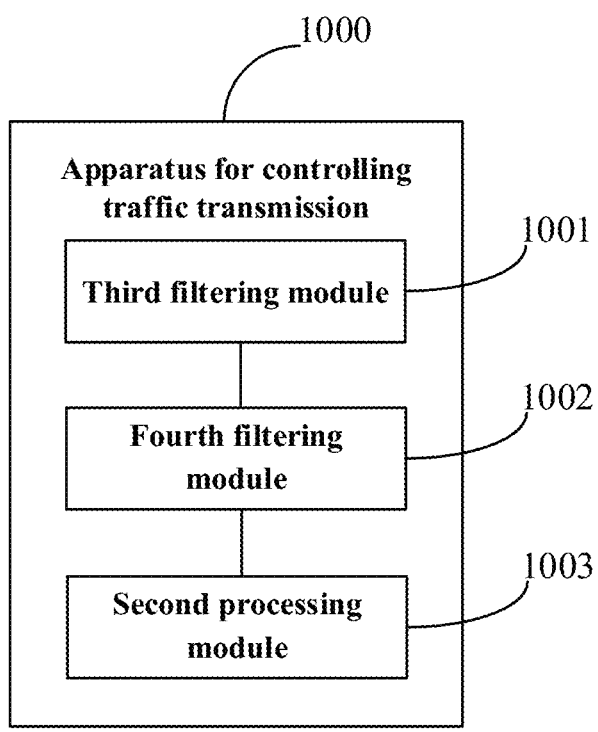
FIG. 10 is a first schematic diagram of another apparatus for controlling traffic transmission according to an example of the disclosure.
Figure 11:
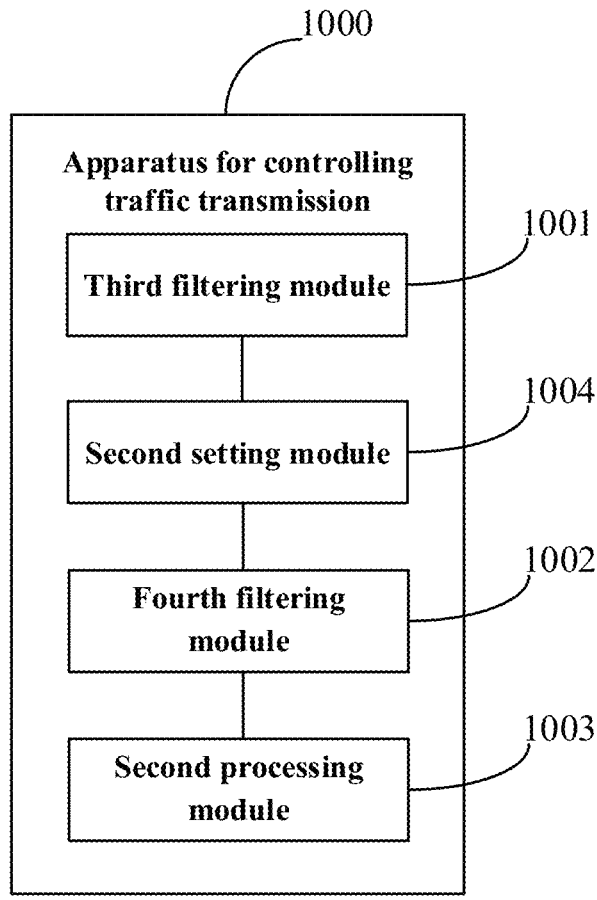
FIG. 11 is a second schematic diagram of another apparatus for controlling traffic transmission according to an example of the disclosure.

With reference to FIGS. 10 and 11, FIG. 10 is a first schematic diagram of another apparatus for controlling traffic transmission according to an example of the disclosure; and FIG. 11 is a second schematic diagram of another apparatus for controlling traffic transmission according to an example of the disclosure. As shown in FIG. 10, the apparatus 1000 for controlling traffic transmission according to the example of the disclosure includes:

a third filtering module 1001 configured to forward, in response to traffic data received by a host, the traffic data to an application layer detector by a network bridge connected to the host, conduct application layer traffic filtering on the traffic data by the application layer detector, and use the traffic data that has passed the application layer traffic filtering as third data;

a fourth filtering module 1002 configured to transmit the third data to a target container connected to the network bridge by the network bridge, conduct transmission layer traffic filtering on the third data based on a transmission layer traffic filtering strategy set in the target container, and determine the traffic data that has passed the transmission layer traffic filtering as fourth data; and a second processing module 1003 configured to process the fourth data in the target container.

In an optional embodiment, the target container is set with a first network interface, and the host is set with a second network interface. The network bridge is set with a third network interface and a fourth network interface. The first network interface is communicatively connected with the third network interface, and the second network interface is communicatively connected with the fourth network interface.

When forwarding the traffic data to the application layer detector by the network bridge connected to the host, the third filtering module 1001 is specifically configured to:

receive the traffic data transmitted by the second network interface of the host by the fourth network interface of the network bridge connected to the host, and invoke a packet forwarding function of the network bridge so as to forward the traffic data to the application layer detector.

When transmitting the third data to the target container connected to the network bridge by the network bridge, the fourth filtering module 1002 is specifically configured to:

forward the third data to the first network interface of the target container connected to the network bridge by the third network interface of the network bridge.

In an optional embodiment, when conducting application layer traffic filtering on the traffic data by the application layer detector, the fourth filtering module 1002 is specifically configured to:

invoke a traffic filtering model associated with the target container from a pre-trained traffic filtering model set by the application layer detector.

conduct application layer traffic filtering on the traffic data based on the traffic filtering model invoked.

In an optional embodiment, as shown in FIG. 11, the apparatus 1000 for controlling traffic transmission further includes a second setting module 1004. The second setting module 1004 is configured to:

obtain the transmission layer traffic filtering strategy, corresponding to the target container, generated by a network policer, and transmit the transmission layer traffic filtering strategy to the network bridge, where the transmission layer traffic filtering strategy indicates quintuple information that satisfies a transmission requirement and quintuple information that does not satisfy a transmission requirement; and set the transmission layer traffic filtering strategy in an independent network namespace of the target container by the network bridge.

When conducting transmission layer traffic filtering on the third data based on the transmission layer traffic filtering strategy set in the target container, the fourth filtering module 1002 is specifically configured to:

read the transmission layer traffic filtering strategy from the independent network namespace, and conduct transmission layer traffic filtering on the third data based on quintuple information carried by the third data, and the quintuple information that satisfies the transmission requirement and the quintuple information that does not satisfy the transmission requirement that are indicated by the transmission layer traffic filtering strategy.

Reference may be made to related description in the above method examples for description of a processing flow of each module in the apparatus and an interaction flow between all the modules, which will not be described in detail herein.

Figure 12:
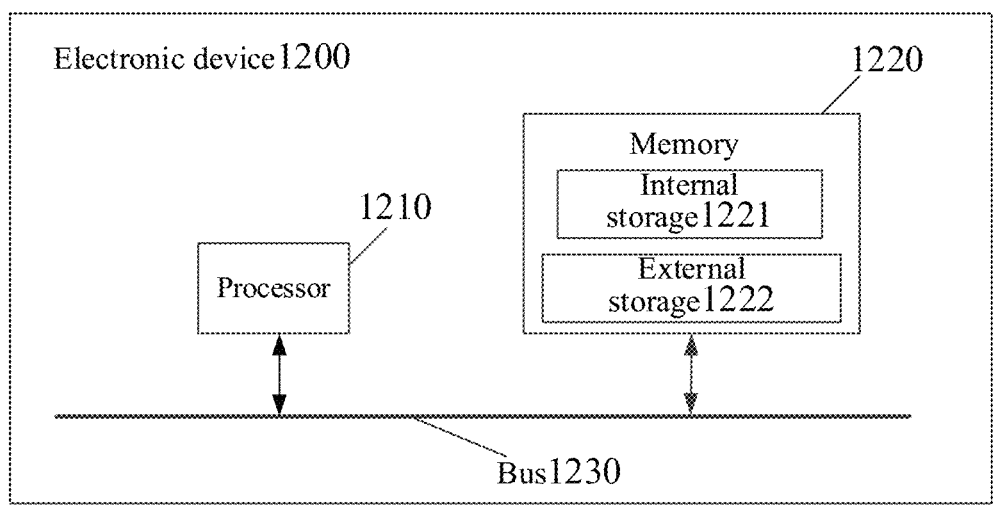
FIG. 12 is a schematic diagram of an electronic device according to an example of the disclosure.

Based on the same technical concept, an example of the disclosure further provides an electronic device. FIG. 12 is a schematic structural diagram of an electronic device 1200 according to an example of the disclosure. The electronic device includes:

a processor 1210, a memory 1220, and a bus 1230. The memory 1220 is configured to store an execution instruction, and includes an internal storage 1221 and an external storage 1222. The internal storage 1221 herein is also referred to as an internal memory, and is configured to temporarily store operation data in the processor 1210 and data exchanged with the external storage 1222 such as a hard disk. The processor 1210 exchanges data with the external storage 1222 by the internal storage 1221. When the electronic device 1200 runs, the processor 1210 is in communication with the memory 1220 by the bus 1230, such that the processor 1210 may execute the execution instruction mentioned in the example of the method for controlling traffic transmission.

An example of the disclosure further provides a computer-readable storage medium. The computer-readable storage medium stores a computer program. The computer program executes steps of the method for controlling traffic transmission according to the above method example when being run by a processor. The storage medium may be a volatile or nonvolatile computer-readable storage medium.

An example of the disclosure further provides a computer program product. The computer program product includes a computer instruction. The computer instruction may execute steps of the method for controlling traffic transmission according to the above method example when being executed by a processor, for which reference may be specifically made to the above method example, which will not be repeated herein.

The computer program product may be embodied in hardware, software, or a combination thereof. In one optional example, the computer program product is embodied as a computer storage medium. In another optional example, the computer program product is embodied as a software product, for instance, a software development kit (SDK).

Those skilled in the art may clearly understand that, for the convenience and conciseness of description, reference may be made to a corresponding process in the above method example for a specific work process of the device and the apparatus described above, which will not be repeated herein. In several examples according to the disclosure, it should be understood that the disclosed device, apparatus and method may be implemented in other manners. The apparatus examples described above are merely schematic, for instance, division of units is merely a division of logic functions, there may be other division modes in actual implementation, and for instance, a plurality of units or components may be combined or integrated into another system, or some features may be omitted or not executed. In addition, the displayed or discussed mutual coupling or direct coupling or communication connection may be implemented with some communication interfaces. Indirect coupling or communication connection between the apparatuses or units may be implemented in an electronic way, a mechanical way, or other ways.

The unit described as a separable part may be physically separated or not, and a part shown as a unit may be a physical unit or not, that is, may be located at one place or may also be distributed on a plurality of network units. Some or all of the units may be selected according to actual needs, so as to achieve the objective of the solution of the example.

In addition, each functional unit in each example of the disclosure may be integrated in one processing unit, or each unit may exist separately and physically, or two or more units may be integrated in one unit.

If the functions are implemented in the form of software functional units and sold or used as independent products, the functions may be stored in one processor-executable nonvolatile computer-readable storage medium. Based on such understanding, the technical solution of the disclosure, in essence or from the view of part contributing to the prior art, or part of the technical solution, may be embodied in the form of a computer software product that is stored in one storage medium and includes several instructions configured to make one computer device (which may be a personal computer, a server, a network device, etc.) execute all or part of the steps of the method in each example of the disclosure. The above storage medium includes: a USB flash disk, a mobile hard disk, a read-only memory (ROM), a random access memory (RAM), a magnetic disk, an optical disk, and other media capable of storing program codes.

Finally, it should be noted that the above examples are merely specific embodiments of the disclosure and used to describe the technical solution of the disclosure, rather than limiting same. The protection scope of the disclosure is not limited to the above examples. Although the disclosure is described in detail with reference to the above examples, those of ordinary skill in the art should understand that any person familiar with the technical field may still modify or easily conceive of changing the technical solution described in the above examples within the technical scope disclosed in the disclosure, or some of the technical 10 features therein may be equivalently replaced. However, these modifications, changes or substitutions do not enable the essence of the corresponding technical solutions to deviate from the spirit and scope of the technical solutions of the examples of the disclosure, and should be all covered by the protection scope of the disclosure. Therefore, the protection scope of the disclosure should be subject to the protection scope of the claims.

We claim:

1. A method for controlling traffic transmission, comprising:
conducting, in response to traffic data generated by a target container, transmission layer traffic filtering on the traffic data based on a transmission layer traffic filtering strategy set in the target container, and determining the traffic data that has passed the transmission layer traffic filtering as first data;
forwarding the first data to an application layer detector by a network bridge connected to the target container, conducting application layer traffic filtering on the first data by the application layer detector, and determining the traffic data that has passed the application layer traffic filtering as second data; and transmitting the second data to a host connected to the network bridge by the network bridge, and transmitting the second data to a destination end corresponding to the second data by the host,
wherein the conducting application layer traffic filtering on the first data by the application layer detector comprises:
invoking a traffic filtering model associated with the target container from a pre-trained traffic filtering model set by the application layer detector, and
conducting the application layer traffic filtering on the first data based on the invoked traffic filtering model.

2. The method of claim 1, wherein before conducting transmission layer traffic filtering on the traffic data based on a transmission layer traffic filtering strategy set in the target container, further comprises:
obtaining the transmission layer traffic filtering strategy, corresponding to the target container, generated by a network policer, and transmitting the transmission layer traffic filtering strategy to the network bridge, wherein the transmission layer traffic filtering strategy indicates quintuple information that satisfies a transmission requirement and quintuple information that does not satisfy a transmission requirement; and
setting the transmission layer traffic filtering strategy in an independent network namespace of the target container by the network bridge; and
wherein conducting transmission layer traffic filtering on the traffic data based on a transmission layer traffic filtering strategy set in the target container comprises:
reading the transmission layer traffic filtering strategy from the independent network namespace, and conducting transmission layer traffic filtering on the traffic data based on quintuple information carried by the traffic data, and the quintuple information that satisfies the transmission requirement and the quintuple information that does not satisfy the transmission requirement that are indicated by the transmission layer traffic filtering strategy.

3. The method of claim 1, wherein the target container is set with a first network interface, the host is set with a second network interface, and the network bridge is set with a third network interface and a fourth network interface, wherein the first network interface is communicatively connected with the third network interface, and the second network interface is communicatively connected with the fourth network interface;
forwarding the first data to an application layer detector by a network bridge connected to the target container comprises:
receiving the first data transmitted by the first network interface of the target container by the third network interface of the network bridge connected to the target container, and invoking a packet forwarding function of the network bridge so as to forward the first data to the application layer detector; and
transmitting the second data to a host connected to the network bridge by the network bridge comprises:
forwarding the second data to the second network interface of the host connected to the network bridge by the fourth network interface of the network bridge.

4. A method for controlling traffic transmission, comprising:
forwarding, in response to traffic data received by a host, the traffic data to an application layer detector by a network bridge connected to the host, conducting application layer traffic filtering on the traffic data by the application layer detector, and determining the traffic data that has passed the application layer traffic filtering as third data;
transmitting the third data to a target container connected to the network bridge by the network bridge, conducting transmission layer traffic filtering on the third data based on a transmission layer traffic filtering strategy set inside the target container, and determining the traffic data that has passed the transmission layer traffic filtering as fourth data; and
processing the fourth data in the target container,
wherein the conducting application layer traffic filtering on the traffic data by the application layer detector comprises:
invoking a traffic filtering model associated with the target container from a pre-trained traffic filtering model set by the application layer detector, and
conducting application layer traffic filtering on the traffic data based on the invoked traffic filtering model.

5. The method of claim 4, wherein the target container is set with a first network interface, the host is set with a second network interface, and the network bridge is set with a third network interface and a fourth network interface, wherein the first network interface is communicatively connected with the third network interface, and the second network interface is communicatively connected with the fourth network interface;
forwarding the traffic data to an application layer detector by a network bridge connected to the host comprises:
receiving the traffic data transmitted by the second network interface of the host by the fourth network interface of the network bridge connected to the host, and invoking a packet forwarding function of the network bridge to forward the traffic data to the application layer detector;
transmitting the third data to a target container connected to the network bridge by the network bridge comprises:
forwarding the third data to the first network interface of the target container connected to the network bridge by the third network interface of the network bridge.

6. The method of claim 4, wherein before conducting transmission layer traffic filtering on the third traffic data based on a transmission layer traffic filtering strategy set in the target container, further comprises:
obtaining the transmission layer traffic filtering strategy, corresponding to the target container, generated by a network policer, and transmitting the transmission layer traffic filtering strategy to the network bridge, wherein the transmission layer traffic filtering strategy indicates quintuple information that satisfies a transmission requirement and quintuple information that does not satisfy a transmission requirement; and
setting the transmission layer traffic filtering strategy in an independent network namespace of the target container by the network bridge;
wherein conducting transmission layer traffic filtering on the third data based on a transmission layer traffic filtering strategy set in the target container comprises:
reading the transmission layer traffic filtering strategy from the independent network namespace, and conducting transmission layer traffic filtering on the third data based on quintuple information carried by the third data, and the quintuple information that satisfies the transmission requirement and the quintuple information that does not satisfy the transmission requirement that are indicated by the transmission layer traffic filtering strategy.

7. An electronic device, comprising: a processor, a memory, and a bus, wherein the memory stores a machine-readable instruction executable by the processor, when the electronic device runs, the processor is in communication with the memory by the bus, and when the machine-readable instruction is executed by the processor, cause the electronic device to perform operations comprising:
conducting, in response to traffic data generated by a target container, transmission layer traffic filtering on the traffic data based on a transmission layer traffic filtering strategy set in the target container, and determining the traffic data that has passed the transmission layer traffic filtering as first data;
forwarding the first data to an application layer detector by a network bridge connected to the target container, conducting application layer traffic filtering on the first data by the application layer detector, and determining the traffic data that has passed the application layer traffic filtering as second data; and
transmitting the second data to a host connected to the network bridge by the network bridge, and transmitting the second data to a destination end corresponding to the second data by the host,
wherein the conducting application layer traffic filtering on the first data by the application layer detector comprises:
invoking a traffic filtering model associated with the target container from a pre-trained traffic filtering model set by the application layer detector, and
conducting application layer traffic filtering on the first data based on the invoked traffic filtering model.

8. The electronic device of claim 7, wherein before conducting transmission layer traffic filtering on the traffic data based on a transmission layer traffic filtering strategy set in the target container, the electronic device is further caused to:
obtain the transmission layer traffic filtering strategy, corresponding to the target container, generated by a network policer, and transmitting the transmission layer traffic filtering strategy to the network bridge, wherein the transmission layer traffic filtering strategy indicates quintuple information that satisfies a transmission requirement and quintuple information that does not satisfy a transmission requirement; and
set the transmission layer traffic filtering strategy in an independent network namespace of the target container by the network bridge.

9. The electronic device of claim 7, wherein the electronic device is further caused to conduct transmission layer traffic filtering on the traffic data based on a transmission layer traffic filtering strategy set in the target container by:
reading the transmission layer traffic filtering strategy from the independent network namespace, and conducting transmission layer traffic filtering on the traffic data based on quintuple information carried by the traffic data, and the quintuple information that satisfies the transmission requirement and the quintuple information that does not satisfy the transmission requirement that are indicated by the transmission layer traffic filtering strategy.

10. The electronic device of claim 7, wherein the target container is set with a first network interface, the host is set with a second network interface, and the network bridge is set with a third network interface and a fourth network interface, wherein the first network interface is communicatively connected with the third network interface, and the second network interface is communicatively connected with the fourth network interface;
forwarding the first data to an application layer detector by a network bridge connected to the target container comprises:
receiving the first data transmitted by the first network interface of the target container by the third network interface of the network bridge connected to the target container, and invoking a packet forwarding function of the network bridge so as to forward the first data to the application layer detector; and
transmitting the second data to a host connected to the network bridge by the network bridge comprises:
forwarding the second data to the second network interface of the host connected to the network bridge by the fourth network interface of the network bridge.

11. The electronic device of claim 7, wherein the electronic device is caused to:
forward, in response to traffic data received by a host, the traffic data to an application layer detector by a network bridge connected to the host, conducting application layer traffic filtering on the traffic data by the application layer detector, and determining the traffic data that has passed the application layer traffic filtering as third data;
transmit the third data to a target container connected to the network bridge by the network bridge, conducting transmission layer traffic filtering on the third data based on a transmission layer traffic filtering strategy set inside the target container, and determining the traffic data that has passed the transmission layer traffic filtering as fourth data; and
process the fourth data in the target container.

12. The electronic device of claim 11, wherein the target container is set with a first network interface, the host is set with a second network interface, and the network bridge is set with a third network interface and a fourth network interface, wherein the first network interface is communicatively connected with the third network interface, and the second network interface is communicatively connected with the fourth network interface.

13. The electronic device of claim 11, wherein the electronic device is caused to forward the traffic data to an application layer detector by a network bridge connected to the host by:
receiving the traffic data transmitted by the second network interface of the host by the fourth network interface of the network bridge connected to the host, and invoking a packet forwarding function of the network bridge to forward the traffic data to the application layer detector;
transmitting the third data to a target container connected to the network bridge by the network bridge comprises:
forwarding the third data to the first network interface of the target container connected to the network bridge by the third network interface of the network bridge.

14. The electronic device of claim 11, wherein the electronic device is caused to conduct application layer traffic filtering on the traffic data by the application layer detector comprises:
invoking a traffic filtering model associated with the target container from a pre-trained traffic filtering model set by the application layer detector; and
conducting application layer traffic filtering on the traffic data based on the invoked traffic filtering model.

15. The electronic device of claim 14, wherein the electronic device is caused to, before conducting transmission layer traffic filtering on the third traffic data based on a transmission layer traffic filtering strategy set in the target container:
- obtain the transmission layer traffic filtering strategy, corresponding to the target container, generated by a network policer, and transmitting the transmission layer traffic filtering strategy to the network bridge, wherein the transmission layer traffic filtering strategy indicates quintuple information that satisfies a transmission requirement and quintuple information that does not satisfy a transmission requirement.

16. The electronic device of claim 15, wherein the electronic device is caused to set the transmission layer traffic filtering strategy in an independent network namespace of the target container by the network bridge.

17. The electronic device of claim 16, wherein the electronic device is caused to conduct transmission layer traffic filtering on the third data based on a transmission layer traffic filtering strategy set in the target container by:
- reading the transmission layer traffic filtering strategy from the independent network namespace, and conducting transmission layer traffic filtering on the third data based on quintuple information carried by the third data, and the quintuple information that satisfies the transmission requirement and the quintuple information that does not satisfy the transmission requirement that are indicated by the transmission layer traffic filtering strategy.

* * * * *